(12) United States Patent
Kim et al.

(10) Patent No.: US 7,978,582 B2
(45) Date of Patent: *Jul. 12, 2011

(54) HIGH-DENSITY RECORDING MEDIUM AND METHOD AND APPARATUS FOR CONTROLLING DATA PLAYBACK THEREOF

(75) Inventors: Jin Yong Kim, Kyunggi-do (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/591,339

(22) Filed: Nov. 17, 2009

(65) Prior Publication Data

US 2010/0067359 A1   Mar. 18, 2010

Related U.S. Application Data

(63) Continuation of application No. 10/787,159, filed on Feb. 27, 2004, now Pat. No. 7,649,819.

(30) Foreign Application Priority Data

Feb. 27, 2003 (KR) .................. 10-2003-0012414

(51) Int. Cl.
    G11B 5/09 (2006.01)
    G11B 7/24 (2006.01)
(52) U.S. Cl. ............... 369/59.25; 369/275.3; 369/47.47
(58) Field of Classification Search ............... 369/275.3, 369/275.4, 53.22, 59.25, 47.47, 47.15, 47.35
    See application file for complete search history.

(56) References Cited

U.S. PATENT DOCUMENTS 4,972,399 A   11/1990   Miyasaka
(Continued)

FOREIGN PATENT DOCUMENTS

CN   1224890   8/1999
(Continued)

OTHER PUBLICATIONS

Office Action for Japanese patent application No. 2008-220318 dated Jan. 8, 2010 with English translation.

(Continued)

*Primary Examiner* — Ali Neyzari
(74) *Attorney, Agent, or Firm* — Harness, Dickey & Pierce, P.L.C.

(57) ABSTRACT

Disclosed herein are a high-density recording medium and a method and apparatus for controlling data playback thereof. Playback control information, such as channel bit length information, is recorded in a burst cutting area (BCA) of a high-density optical disc in a wobble type. When the high-density optical disc is reproduced, the playback control information is detected in a push-pull signal detection mode and the optimum data playback operation corresponding to the recording capacity of the optical disc is performed on the basis of the detected playback control information. Alternatively, bit error rates (BERs) are calculated while a plurality of predetermined bit detection modes are sequentially performed, one of the bit detection modes corresponding to the smallest one of the calculated BERs is selected and the data playback operation is performed in the selected bit detection mode. Therefore, it is possible to perform a data playback operation optimal to the recording capacity of a BD-ROM (Blu-ray Disc-ROM) even through disc information (DI) is recorded in a PIC (Permanent Information & Control data) zone of the BD-ROM in a recording format necessitating a decoding process and the recording capacity is any of different values such as 23 Gbytes, 25 Gbytes, 27 Gbytes, etc.

16 Claims, 8 Drawing Sheets

U.S. PATENT DOCUMENTS

| | | |
|---|---|---|
| 5,124,962 A | 6/1992 | Haneji |
| 5,341,356 A | 8/1994 | Dieleman et al. |
| 6,081,785 A | 6/2000 | Oshima et al. |
| 6,118,927 A | 9/2000 | Kikuchi et al. |
| 6,208,603 B1 | 3/2001 | Ishida et al. |
| 6,252,734 B1 | 6/2001 | Kahlman et al. |
| 6,278,671 B1 | 8/2001 | Gotoh et al. |
| 6,377,526 B1 | 4/2002 | Vining et al. |
| 6,414,920 B1 | 7/2002 | Lee |
| 6,594,794 B1 | 7/2003 | De Marzi et al. |
| 6,608,804 B2 | 8/2003 | Shim |
| 6,938,162 B1 | 8/2005 | Nagai et al. |
| 6,992,959 B1 | 1/2006 | Tosaki et al. |
| 7,304,937 B1 | 12/2007 | Xie |
| 7,688,697 B2 * | 3/2010 | Jeon et al. .......... 369/59.25 |
| 2001/0007545 A1 | 7/2001 | Ueda et al. |
| 2002/0060968 A1 | 5/2002 | Senshu |
| 2002/0085466 A1 | 7/2002 | Shim |
| 2002/0191510 A1 | 12/2002 | Senshu |
| 2003/0016603 A1 | 1/2003 | Tomita |
| 2003/0185128 A1 | 10/2003 | Shoji et al. |
| 2004/0156294 A1 | 8/2004 | Watanabe et al. |
| 2010/0177616 A1 * | 7/2010 | Jeon et al. .......... 369/59.25 |

FOREIGN PATENT DOCUMENTS

| | | |
|---|---|---|
| EP | 0 997 904 | 5/2000 |
| EP | 1 115 117 | 7/2001 |
| EP | 1 178 471 | 2/2002 |
| EP | 1 191 531 | 3/2002 |
| EP | 1 365 392 | 11/2003 |
| GB | 2 332 977 | 7/1999 |
| JP | 61-208676 | 9/1986 |
| JP | 04-232664 | 8/1992 |
| JP | 04-283474 | 10/1992 |
| JP | 05-282795 | 10/1993 |
| JP | 08-212716 | 8/1996 |
| JP | 09-282808 | 10/1997 |
| JP | 10-097765 | 4/1998 |
| JP | 10-106161 | 4/1998 |
| JP | 10-188361 | 7/1998 |
| JP | 10-320926 | 12/1998 |
| JP | 10-334605 | 12/1998 |
| JP | 10-340527 | 12/1998 |
| JP | 11-45461 | 2/1999 |
| JP | 11-073648 | 3/1999 |
| JP | 11-102576 | 4/1999 |
| JP | 11-213532 | 8/1999 |
| JP | 11-296862 | 10/1999 |
| JP | 11-338956 | 12/1999 |
| JP | 2000-078519 | 3/2000 |
| JP | 2000-132903 | 5/2000 |
| JP | 2001-229542 | 8/2001 |
| JP | 2001-229545 | 8/2001 |
| JP | 2001-243636 | 9/2001 |
| JP | 2001-256655 | 9/2001 |
| JP | 2003-006997 | 1/2003 |
| JP | 2003-036543 | 2/2003 |
| JP | 2003-196843 | 7/2003 |
| KR | 10-1999-0060372 | 7/1999 |
| KR | 2001-0007191 | 1/2001 |
| KR | 2001-0070430 | 7/2001 |
| KR | 10-2001-0095391 | 11/2001 |
| KR | 2002-0075508 | 10/2002 |
| KR | 2002-0087336 | 11/2002 |
| KR | 2003-0011603 | 2/2003 |
| KR | 10-0713093 | 4/2007 |
| WO | WO 0026912 | 5/2000 |
| WO | WO 01/11890 | 2/2001 |
| WO | WO 02/086873 | 10/2002 |
| WO | WO 02/086887 | 10/2002 |
| WO | WO 2004/066286 | 8/2004 |

OTHER PUBLICATIONS

Office Action for Japanese patent application No. 2008-220318 dated May 14, 2010.

http://www.catnet.ne.jp/triceps, "DVD-RAM Technology", Nov. 27, 2000, p. 18.

Intel Corporation et al., "Content Protection for Recordable Media Specification," DVD Book, Revision 0.94, Oct. 18, 2000. (XP002167964).

International Search Report for corresponding PCT Application No. PCT/KR2003/01689 dated Nov. 28, 2003.

International Search Report for corresponding PCT Application No. PCT/KR2004/000422 dated Jun. 23, 2004.

Office Action for corresponding European Patent Application No. 03 79 2867 dated Sep. 19, 2005.

Office Action for corresponding Australian Patent Application No. 2004210554 dated Apr. 21, 2006.

Office Action for corresponding U.S. Appl. No. 10/645,566 dated Aug. 4, 2006.

Office Action for corresponding U.S. Appl. No. 10/645,566 dated Jan. 9, 2007.

Office Action for corresponding Chinese Patent Application No. 03801541.2 dated May 25, 2007.

Office Action for corresponding Russian Patent Application No. 2004137479/28 dated May 30, 2007.

Office Action for corresponding Australian Patent Application No. 2004210554 dated Sep. 3, 2007.

Office Action for corresponding Japanese Patent Application No. 2004-530648 dated Oct. 2, 2007.

Office Action for corresponding Chinese Patent Application No. 200480000152.6 dated Nov. 23, 2007.

Office Action for corresponding U.S. Appl. No. 10/645,566 dated Jan. 10, 2008.

Office Action for corresponding European Patent Application No. 04715572.6 dated Feb. 27, 2008.

Office Action for Canadian patent application No. 2 505 912 dated Aug. 18, 2009.

Office Action for Canadian patent application No. 2 464 221 dated Aug. 18, 2009.

"120 mm DVD Rewritable Disk (DVD-RAM)," ECMA-272, Jun. 1999, URL: http://www.ecma-international.org/publications/standards/Standard.htm, date last accessed: Aug. 3, 2009.

Office Action for European patent application No. 04715572.6-2210 dated Jul. 4, 2008.

Office Action for corresponding Japanese patent application No. 2004-530648 dated Aug. 29, 2008.

Office Action for European patent application No. 03792867.8-2223 dated Sep. 17, 2008.

"Standard ECMA-267, 3$^{rd}$ Edition: 120 mm DVD—Read-only Disk," Standard ECMA-267, ECMA: Standardizing Information and Communication Systems, Apr. 1, 2001, pp. 1-96.

Office Action for Korean patent application No. 10-2002-0062522 dated Apr. 9, 2009.

Office Action for Korean patent application No. 10-2003-0012414 dated Jul. 22, 2009.

Notice of Allowance for Korean patent application No. 10-2002-0049637 dated Jul. 30, 2009.

Office Action for Japanese patent application No. 2004-530648 dated Jul. 7, 2009 (with English translation).

Office Action for European patent application No. 03 792 867.8 dated Jul. 27, 2009.

Office Action for U.S. Appl. No. 10/645,566 dated Jul. 8, 2008.

Office Action for Japanese patent publication No. 2006-502723 dated Mar. 28, 2008.

Office Action for Japanese patent application No. 2008-220318 dated Apr. 24, 2009 (with English translation).

Office Action for Japanese patent application No. 2006-502723 dated May 8, 2009 (with English translation).

Office Action for U.S. Appl. No. 10/645,566 dated Jun. 2, 2009.

Canadian Office Action dated Jan. 20, 2011 issued in corresponding Canadian Application No. 2505912 with English translation.

Japanese Office Action dated Jan. 21, 2011 issued in corresponding Japanese Application No. 2006-502723.

* cited by examiner

Biphase modulated HFM groove

Disc Information (in PIC Area)

| Byte number | Content | Number of bytes |
|---|---|---|
| 0 | Disc Informaton Identifier = "DI" | 2 |
| 2 | DI Format | 1 |
| 3 | Reserved = 00h | 1 |
| ⋮ | ⋮ | ⋮ |
| 12 | Disc Structure | 1 |
| 13 | Channel Bit Length | 1 |
| ⋮ | ⋮ | ⋮ |

(Wobble)

bits b7 to b4 : reserved "0000"
bits b3 to b0 : specify main data channel bit length
　　　　"0000" -- 80nm (23G)
　　　　"0001" -- 74.5nm (25G)
　　　　"0010" -- 69nm (27G)

" Push pull Signal Detection "

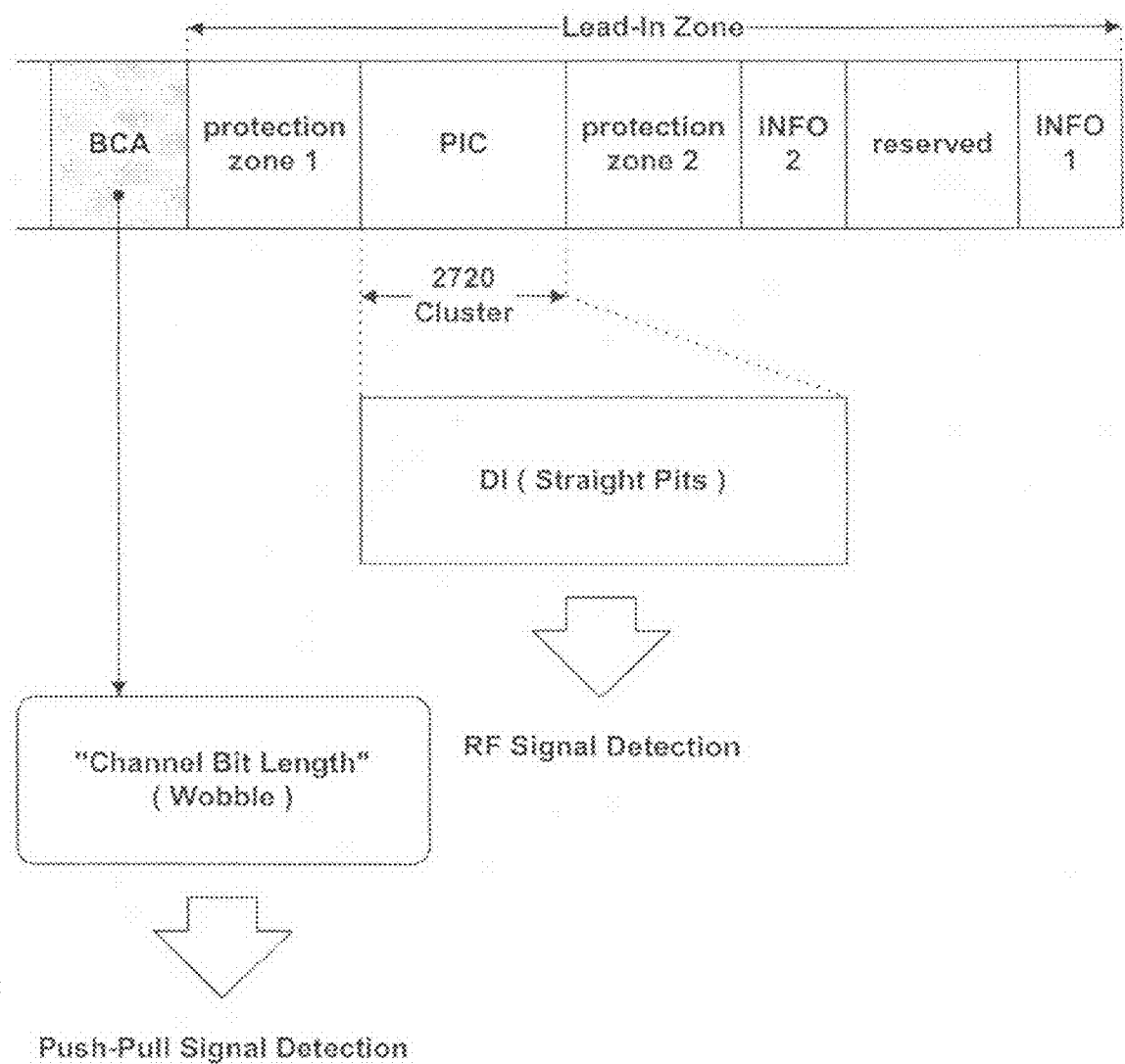

FIG. 6

| 1 byte | 4 bytes | | | | | |
|---|---|---|---|---|---|---|
| SB(3,3) | BCA pre-amble (all 00h) | | | | 1 row | |
| SB(0,0) | I(0,0) | I(1,0) | I(2,0) | I(3,0) | | |
| SB(0,0) | I(4,0) | I(5,0) | I(6,0) | I(7,0) | 4 rows | |
| SB(0,0) | I(8,0) | I(9,0) | I(10,0) | I(11,0) | data | 1st |
| SB(0,0) | I(12,0) | I(13,0) | I(14,0) | I(15,0) | | data |
| SB(0,1) | C(0,0) | C(1,0) | C(2,0) | C(3,0) | | unit |
| SB(0,1) | C(4,0) | C(5,0) | C(6,0) | C(7,0) | 4 rows | |
| SB(0,1) | C(8,0) | C(9,0) | C(10,0) | C(11,0) | parity | |
| SB(0,1) | C(12,0) | C(13,0) | C(14,0) | C(15,0) | | |
| SB(0,2) | I(0,1) | I(1,1) | I(2,1) | I(3,1) | | |
| SB(0,2) | I(4,1) | I(5,1) | I(6,1) | I(7,1) | 4 rows | |
| SB(0,2) | I(8,1) | I(9,1) | I(10,1) | I(11,1) | data | 2nd |
| SB(0,2) | I(12,1) | I(13,1) | I(14,1) | I(15,1) | | data |
| SB(0,3) | C(0,1) | C(1,1) | C(2,1) | C(3,1) | | unit |
| SB(0,3) | C(4,1) | C(5,1) | C(6,1) | C(7,1) | 4 rows | |
| SB(0,3) | C(8,1) | C(9,1) | C(10,1) | C(11,1) | parity | |
| SB(0,3) | C(12,1) | C(13,1) | C(14,1) | C(15,1) | | |
| SB(1,0) | I(0,2) | I(1,2) | I(2,2) | I(3,2) | | |
| SB(1,0) | I(4,2) | I(5,2) | I(6,2) | I(7,2) | 4 rows | |
| SB(1,0) | I(8,2) | I(9,2) | I(10,2) | I(11,2) | data | 3rd |
| SB(1,0) | I(12,2) | I(13,2) | I(14,2) | I(15,2) | | data |
| SB(1,1) | C(0,2) | C(1,2) | C(2,2) | C(3,2) | | unit |
| SB(1,1) | C(4,2) | C(5,2) | C(6,2) | C(7,2) | 4 rows | |
| SB(1,1) | C(8,2) | C(9,2) | C(10,2) | C(11,2) | parity | |
| SB(1,1) | C(12,2) | C(13,2) | C(14,2) | C(15,2) | | |
| SB(1,2) | I(0,3) | I(1,3) | I(2,3) | I(3,3) | | |
| SB(1,2) | I(4,3) | I(5,3) | I(6,3) | I(7,3) | 4 rows | |
| SB(1,2) | I(8,3) | I(9,3) | I(10,3) | I(11,3) | data | 4th |
| SB(1,2) | I(12,3) | I(13,3) | I(14,3) | I(15,3) | | data |
| SB(1,3) | C(0,3) | C(1,3) | C(2,3) | C(3,3) | | unit |
| SB(1,3) | C(4,3) | C(5,3) | C(6,3) | C(7,3) | 4 rows | |
| SB(1,3) | C(8,3) | C(9,3) | C(10,3) | C(11,3) | parity | |
| SB(1,3) | C(12,3) | C(13,3) | C(14,3) | C(15,3) | | |
| SB(3,2) | | | | | | |

| b7 | b6 | b5 | b4 | b3 | b2 | b1 | b0 |
|---|---|---|---|---|---|---|---|

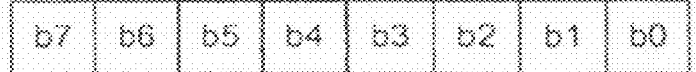

00 : 23G -- 80nm
01 : 25G -- 74.5 nm
10 : 27G -- 69nm
11 : reserved

US 7,978,582 B2

HIGH-DENSITY RECORDING MEDIUM AND METHOD AND APPARATUS FOR CONTROLLING DATA PLAYBACK THEREOF

PRIORITY INFORMATION

This application is a continuation of U.S. application Ser. No. 10/787,159, filed Feb. 27, 2004 now U.S. Pat. No. 7,649, 819, which claims priority of Korean Application No. 10-2003-0012414, filed Feb. 27, 2003. The entire contents of these applications are incorporated herein by reference. This application priority to both of the above mentioned prior filed applications.

TECHNICAL FIELD

The present invention relates to a high-density recording medium and a method and apparatus for controlling data playback/recording thereof, and more particularly to a high-density optical disc, such as a BD (Blu-ray Disc), and a method and apparatus for controlling data playback/recording thereof, wherein it is possible to perform a data playback/recording operation optimal to the recording capacity of the high-density optical disc.

BACKGROUND ART

The recent rapid progress in standardization of a new high-density optical disc, for example, a BD-RE (Blu-ray Disc-Rewritable), capable of recording high-quality video data and high-quality audio data for a lengthy period of time has led to anticipation that the associated products will be developed and commercially available.

The BD-RE has, as shown in FIG. 1, a clamping area, transition area, burst cutting area (BCA) and lead-in area defined sequentially at the inner periphery thereof, and a data area and lead-out area defined respectively at the intermediate portion and outer periphery thereof.

The lead-in area is partitioned into a first protection zone Protection zone 1, a PIC (Permanent Information & Control data) zone, a second protection zone Protection zone 2, an information 2 zone Info 2, an optimum power control (OPC) zone, etc. Whereas the first protection zone and PIC zone are pre-recorded areas where data is pre-recorded in advance, the remaining zones of the lead-in area, the data area and the lead-out area are rewritable areas where new data is rewritten.

High frequency modulated (HFM) grooves are formed in the PIC zone, in which main information of the disc to be permanently preserved is stored. These HFM grooves are modulated by a bi-phase modulation method to store disc information (DI), as shown in FIG. 2.

That is, HFM grooves are modulated in the radial direction with a rather high bandwidth signal, to create a data channel for replicated information with sufficient capacity and data rate.

In this modulation method, a bit with value 0 is represented by a transition at the start of the bit cell and a bit with value 1 is represented by a transition at the start and in the middle of the bit cell. The modulated bits are recorded on the disc by a deviation of the groove from its average centerline as indicated in FIG. 2. The length of each bit cell shall be 36T, where T corresponds to the length of a channel bit in the rewritable data areas.

The disc information (DI) contains, as shown in FIG. 3, channel bit length information with a size of 1 byte, which is detected based on a push-pull signal. Four bits b7 to b4 of the channel bit length information are reserved bits having values of '0000', and the remaining four bits b3 to b0 represent the channel bit length of main data such as an A/V stream.

For example, the remaining four bits b3 to b0 represent that the channel bit length of the main data is 80 nm and the recording capacity of the optical disc is 23 Gbytes if they are '0000', that the channel bit length is 74.5 nm and the recording capacity is 25 Gbytes if they are '0001', and that the channel bit length is 69 nm and the recording capacity is 27 Gbytes if they are '0010'.

In this connection, an optical disc device selects a partial response maximum likelihood (PRML) corresponding to the recording capacity of the BD-RE with reference to the channel bit length information contained in the disc information and performs a bit detection mode appropriate to the selected PRML, so as to normally perform a data playback operation.

Meanwhile, the standardization of a new high-density optical disc, as well as the BD-RE, is recently under discussion among the associated companies. The new high-density optical disc may be, for example, a BD-ROM, which has, as shown in FIG. 4, an inner area, clamping area, transition area, information area and rim area.

The information area includes a BCA, and a PIC zone in which disc information (DI) is recorded. This DI is recorded in the PIC zone in a straight pit type that is the same recording format as that of main data recorded in a data zone.

The DI recorded in the straight pit type must be subjected to a decoding process since it is detected in a radio frequency (RF) signal detection mode, not in a push-pull signal detection mode. However, there is a problem in that an error occurs in the data playback operation if channel bit length information recorded in the DI is not normally detected in the early stage of the data recording/playback operation.

Also, because the DI only can be read after full start-up of the drive, it takes a time to start recording or playback of data.

DISCLOSURE OF INVENTION

Therefore, the present invention has been made in view of the above problem, and it is an object of the present invention to provide a high-density optical disc wherein a control information recorded on the optical disc, such as channel bit length information, can be detected without a separate decoding operation, or in early stage of drive start-up.

It is another object of the present invention to provide a method for detecting a control information additionally recorded in a specific area of a high-density optical disc, such as channel bit length information, without a separate decoding operation or in early stage of drive start-up and performing a data playback/recording operation on the basis of the detected a control information.

It is yet another object of the present invention to provide a method and apparatus for selecting a bit detection mode most appropriate to a high-density optical disc and performing a data playback operation in the selected bit detection mode.

In accordance with an aspect of the present invention, the above and other objects can be accomplished by the provision of a high-density recording medium containing: a lead-in zone in which recording medium information is recorded; and a specific area, prior to or within the lead-in zone, in which a control information regarding a recording capacity of the high-density recording medium is recorded.

In accordance with another aspect of the present invention, there is provided a method for controlling data playback/recording of a high-density recording medium, comprising the steps of: a) detecting a control information regarding a channel bit length of the high-density recording medium from a specific area using a push-pull signal detection mode; and b)

performing a data playback/recording operation with reference to the detected a control information.

In accordance with a further aspect of the present invention, there is provided a method for controlling data playback of a high-density recording medium, comprising the steps of: a) sequentially performing a plurality of predetermined bit detection modes with regard to the recording medium to calculate bit error rates in the bit detection modes, respectively; and b) selecting one of the bit detection modes corresponding to a smallest one of the calculated bit error rates and performing a data playback operation in the selected bit detection mode.

In accordance with yet another aspect of the present invention, there is provided an apparatus for controlling data playback of a high-density recording medium, comprising: a detection unit for performing one of a plurality of predetermined bit detection modes with regard to the high-density recording medium; a decoding unit for calculating and outputting a bit error rate from data bits detected by the detection unit; and a control unit for controlling the bit detection mode of the detection unit and selecting one of the bit detection modes corresponding to a smallest bit error rate on the basis of the calculated bit error rate.

BRIEF DESCRIPTION OF DRAWINGS

The accompanying drawings, which are included to provide a further understanding of the invention, illustrate the preferred embodiments of the invention, and together with the description, serve to explain the principles of the present invention.

FIGS. 5 and 6 are views showing recorded states of channel bit length information in a BCA according to the present invention;

Features, elements, and aspects of the invention that are referenced by the same numerals in different figures represent the same, equivalent, or similar features, elements, or aspects in accordance with one or more embodiments.

MODES FOR CARRYING OUT THE INVENTION

Now, preferred embodiments of a high-density recording medium and a method and apparatus for controlling data playback thereof according to the present invention will be described in detail with reference to the annexed drawings.

Figure 1:
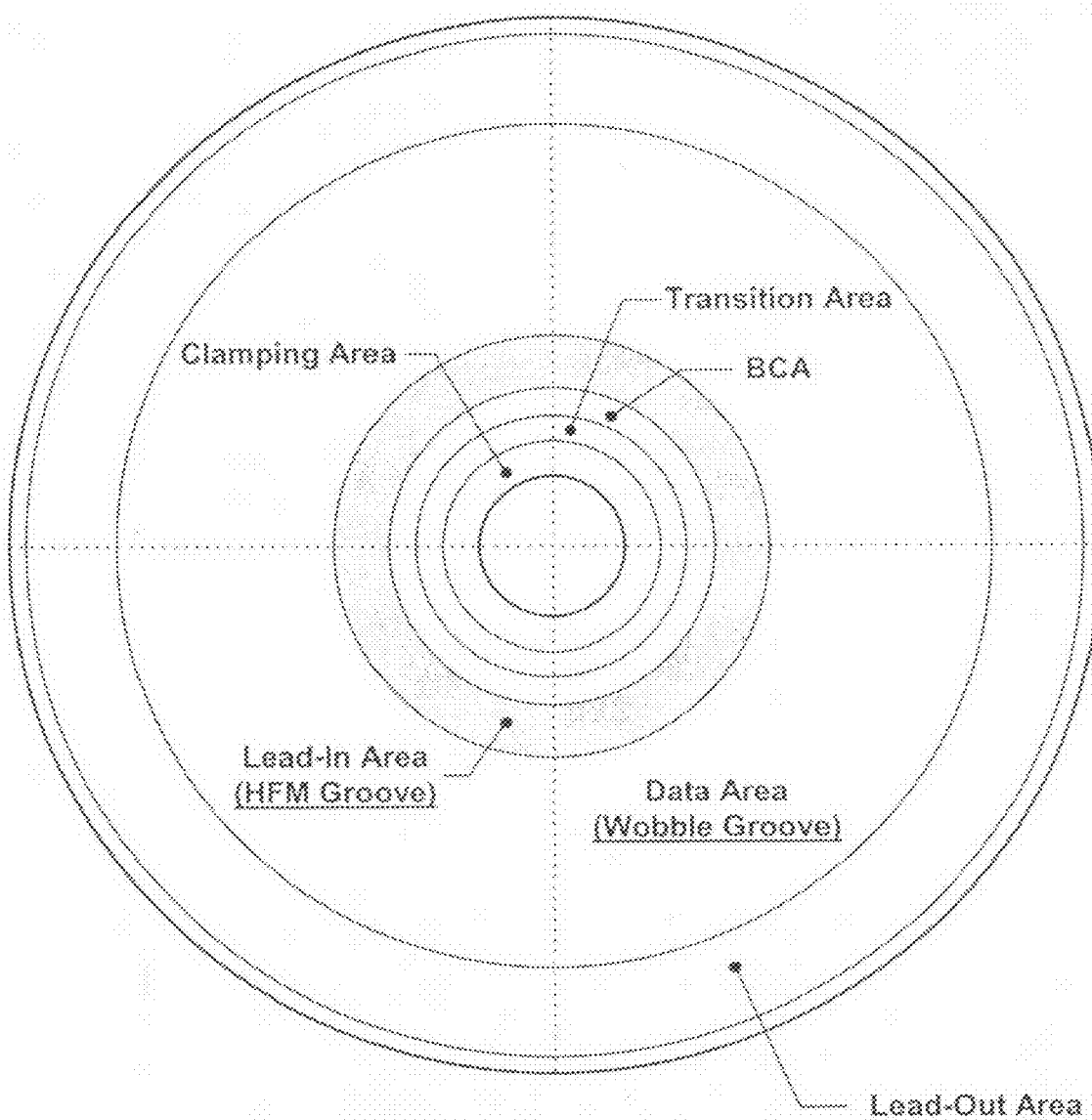
FIG. 1 is a view showing the structure of a BD-RE.
Figure 2:
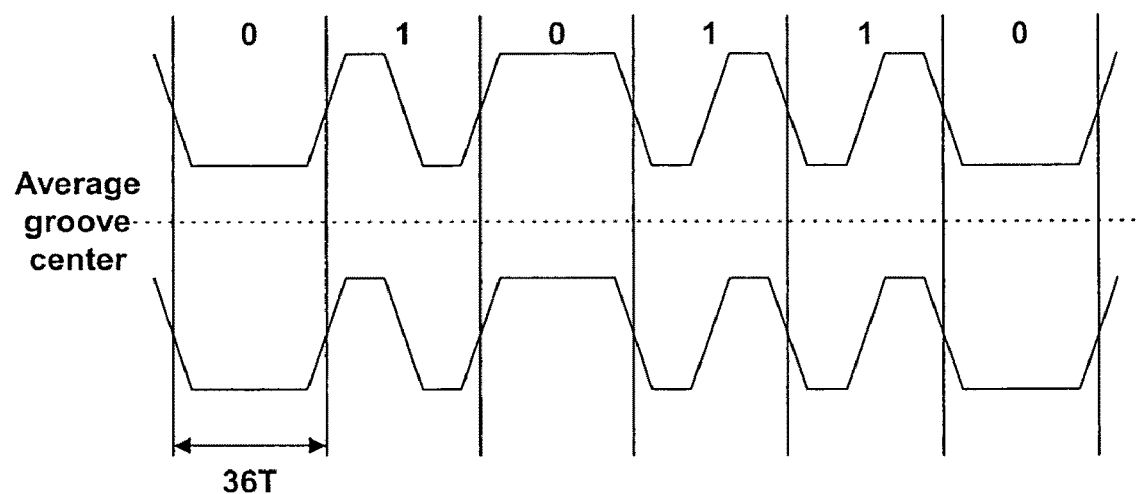
FIG. 2 is a view showing HFM grooves formed in a PIC zone of the BD-RE.
Figure 3:
FIG. 3 is a view illustrating channel bit length information contained in disc information (DI) of the BD-RE.
Figure 4:
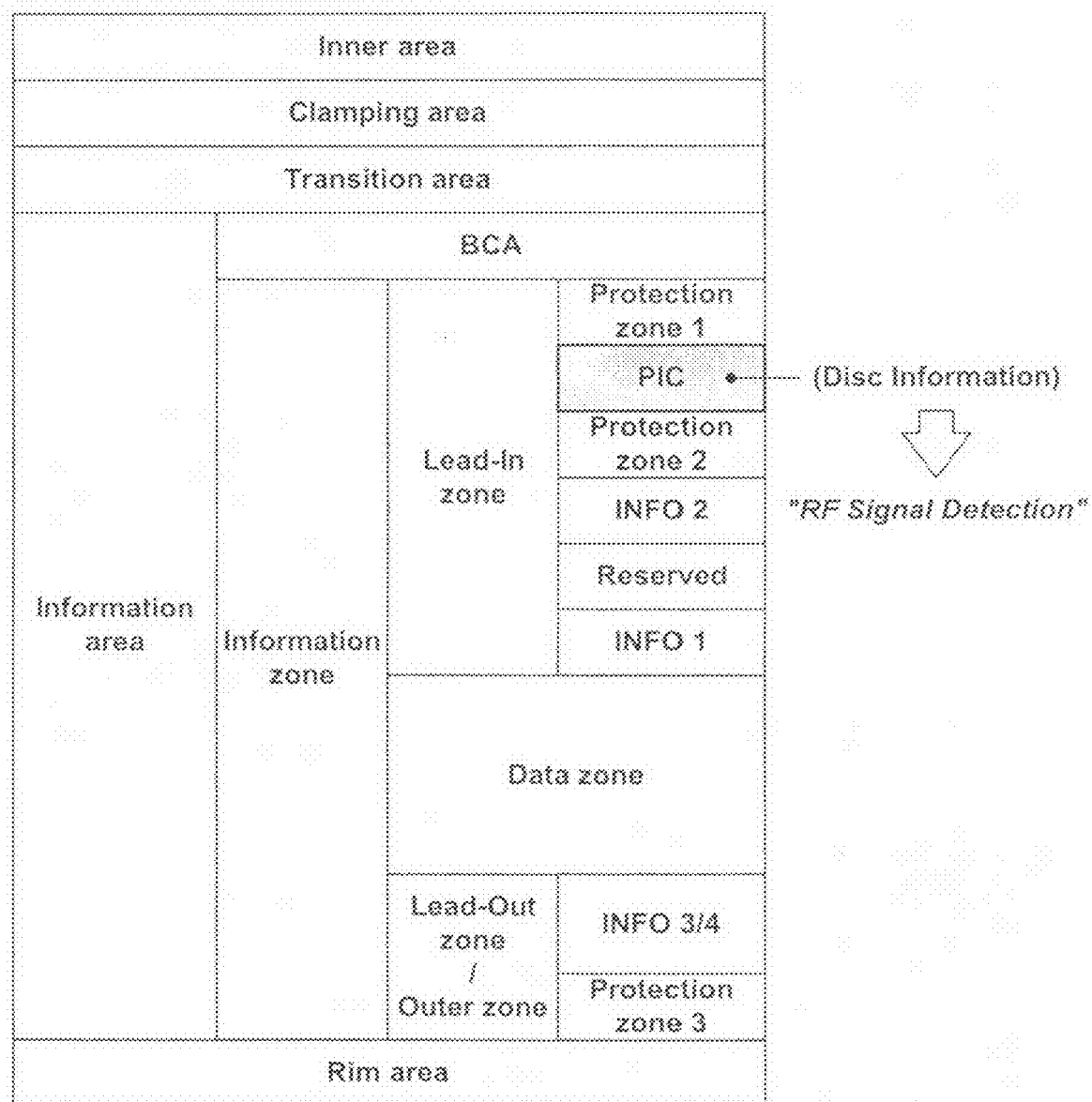
FIG. 4 is a table showing the structure of a BD-ROM to which the present invention is applied.

A high-density optical disc, for example, a BD-ROM, to which the present invention is applied has an information area including a BCA, PIC zone, data zone, etc., as stated previously with reference to FIG. 4. Disc information (DI) is recorded in the PIC zone in a straight pit type, and main data, such as an A/V stream, is recorded in the data zone in the straight pit type. The DI, recorded in the straight pit type, is detected in an RF signal detection mode, as shown in FIG. 5.

In one embodiment of the present invention, playback control information, such as channel bit length information set to a different value depending on the recording capacity of the optical disc, is additionally recorded in a specific area prior to the PIC zone, for example, the BCA, in a wobble type. Alternatively, the channel bit length information may be recorded in the PIC zone in the wobble type. In either case, the channel bit length information, recorded in the wobble type, can be detected in a push-pull signal detection mode without a separate decoding process.

The channel bit length information can be recorded, as shown in FIG. 6, with a size of at least 2 bits of the first byte of each data unit recorded in the BCA, as will hereinafter be described in detail.

The BCA code is based on a structure of maximum 4 data units as shown in FIG. 6. Each data unit contains 16 information bytes I(m,n) and 16 parity bytes C(m,n). Furthermore, the code structure contains Sync bytes SB(a,b) and a BCA preamble.

In FIG. 6, the first byte I(0, n) of each data unit indicates channel bit length information. For example, the minimum channel bit length is 80 nm corresponding to a recording capacity of 23 Gbytes if bits 'b5 and b4' of the first byte of each data unit are recorded as '00', 74.5 nm corresponding to 25 Gbytes if they are recorded as '01', and 69 nm corresponding to 27 Gbytes if they are recorded as '10'.

Figure 7:
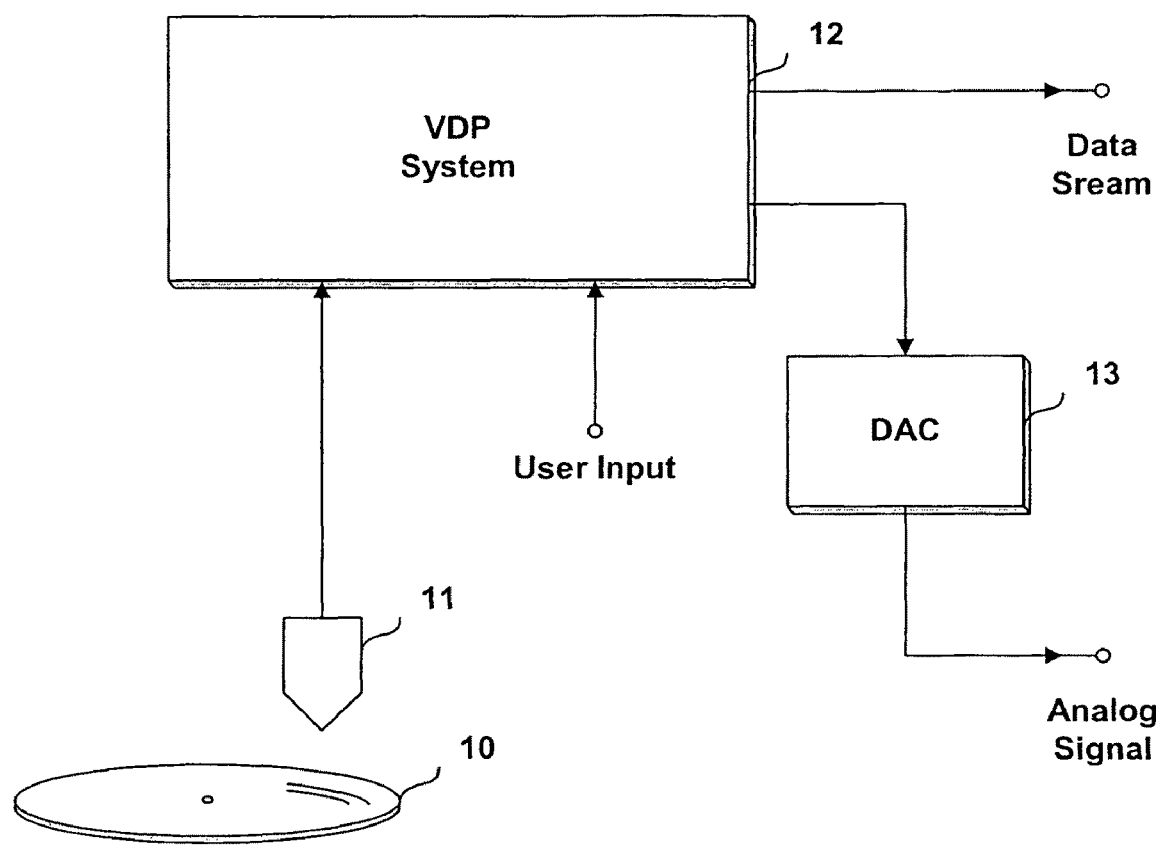
FIG. 7 is a view schematically showing the configuration of an optical disc device to which the present invention is applied.

FIG. 7 schematically shows the configuration of an optical disc device to which the present invention is applied. As shown in this drawing, the optical disc device comprises an optical pickup 11, a video disc play (VDP) system 12, a digital/analog (D/A) converter 13 and so forth. If a BD-ROM 10 is loaded therein, then the optical disc device detects, during initial servo operation, channel bit length information recorded in the BCA of the BD-ROM 10 in the wobble type using the push-pull signal detection mode without a separate decoding process.

Where the value of the channel bit length information is 'b5b4=00', the optical disc device determines that the recording capacity of the optical disc is 23 Gbytes and the minimum channel bit length of recorded data is 80 nm, selects a partial response maximum likelihood (PRML) corresponding to the determination results, and performs a bit detection mode appropriate to the selected PRML. Where the value of the channel bit length information is 'b5b4=01', the optical disc device determines that the recording capacity of the optical disc is 25 Gbytes and the minimum channel bit length of recorded data is 74.5 nm, and performs a bit detection mode corresponding to the determination results. Where the value of the channel bit length information is 'b5b4=10', the optical disc device determines that the recording capacity of the optical disc is 27 Gbytes and the minimum channel bit length of recorded data is 69 nm, and performs a bit detection mode corresponding to the determination results. As a result, the optical disc device can accurately reproduce DI and main data recorded in the straight pit type.

In another embodiment of the present invention, in the case where there is no channel bit length information of the wobble type additionally recorded in the BCA of the BD-ROM 10, the VDP system 12 of the optical disc device checks the recording capacity of the loaded optical disc and selects a bit detection mode most appropriate thereto in order to accurately reproduce DI recorded on the optical disc, more particularly DI recorded in the PIC zone of the disc in the straight pit type, and main data recorded in the data zone of the disc, as will hereinafter be described in detail.

Figure 8:
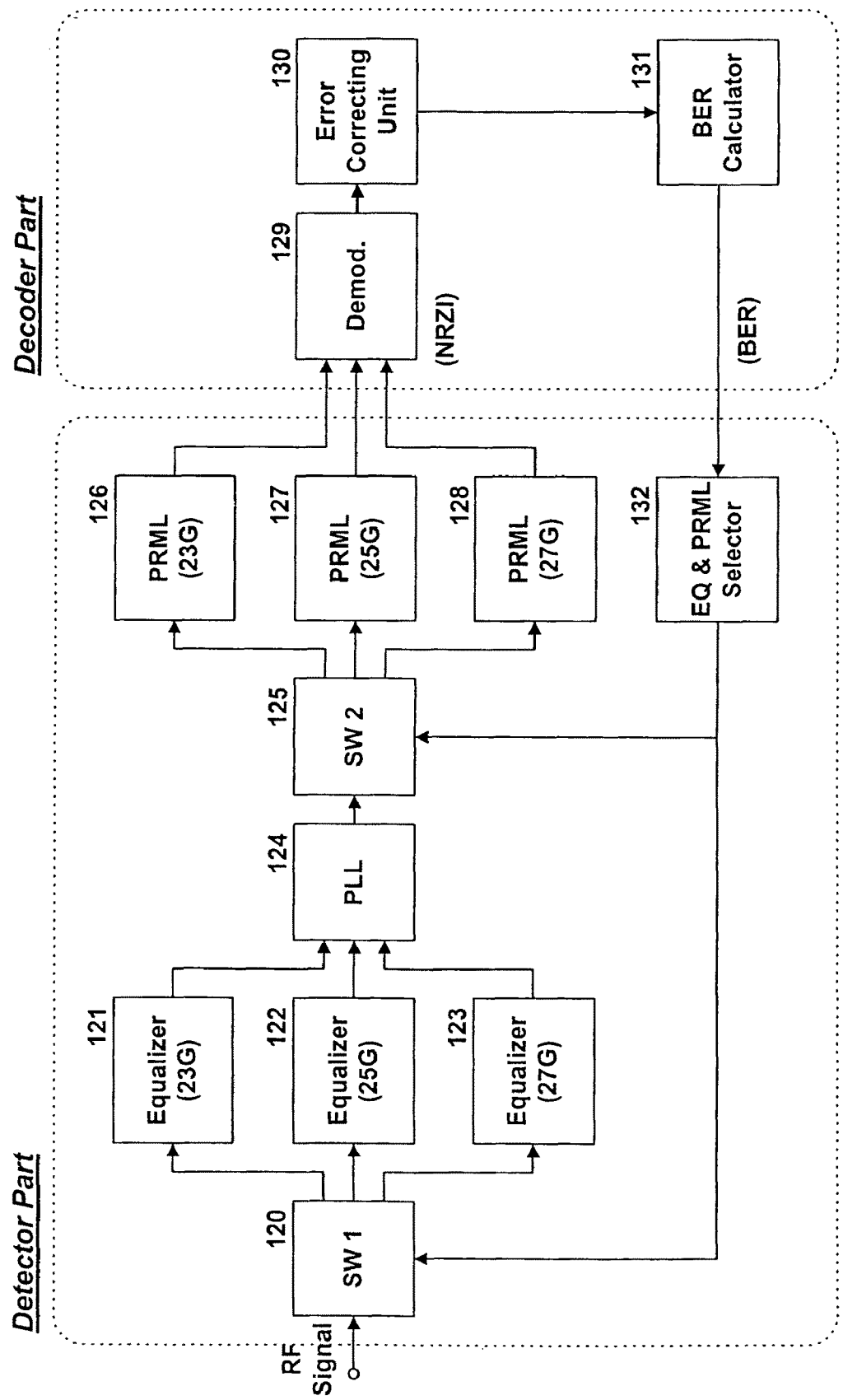
FIG. 8 is a block diagram conceptually showing a part of the configuration of the optical disc device to which the present invention is applied.

The VDP system 12 includes, as shown in FIG. 8, a detector part including a plurality of, for example, first to third equalizers 121, 122 and 123, a first switch 120 for selecting one of the first to third equalizers 121, 122 and 123 and applying an RF input signal to the selected equalizer, a phase locked loop (PLL) circuit 124, a plurality of, for example, first to third PRML detectors 126, 127 and 128, a second switch 125 for selecting one of the first to third PRML detectors 126, 127 and 128 and applying an output signal from the PLL circuit 124 to the selected PRML detector, and an equalizer/PRML selector 132 for controlling the first and second switches 120 and 125. The VDP system 12 further includes a decoder part including a demodulator 129 for demodulating modulated data of a certain format, an error correcting unit 130 for performing error correction for the demodulated data, and a bit error rate (BER) calculator 131 for calculating a BER of the demodulated data.

Although the equalizer/PRML selector 132 has been disclosed to be included in the detector part in the present embodiment, it may be included in the decoder part, not in the detector part, or separately configured as a separate part (not shown).

The PRML (Partial Response and Maximum Likelihood) is a process to detect binary data from Read channel 1 signal (RF signal). It typically consists of an equalizer and a Viterbi decoder.

The equalizer controls inter-symbol interference of Read channel 1 signal (RF signal) and fit Read channel 1 signal to a partial response channel. The partial response channel means that the impulse response appears at plural sample points and it is linear time invariant.

The Viterbi decoder detects binary data using a known correlation of Read channel 1 signal.

The equalizer/PRML selector 132, in the early stage of the data playback operation, controls the first switch 120 and the second switch 125 such that a first bit detection mode appropriate to an optical disc of 23 Gbytes recording capacity is performed. In the first bit detection mode, an RF signal read from the BD-ROM 10 is passed along a first path of the first equalizer 121, PLL 124 and first PRML detector 126.

The BER calculator 131 checks bit data demodulated and error-corrected by the demodulator 129 and error correcting unit 130 to calculate a first BER (BER #1) that is the ratio between normal bit data and erroneous bit data, and then outputs the calculated first BER to the equalizer/PRML selector 132.

The above operation is similarly performed sequentially with regard to second and third paths so that second and third BERs (BER #2 and BER #3) are calculated and outputted to the equalizer/PRML selector 132.

Thereafter, the equalizer/PRML selector 132 selects a path where the smallest amount of bit error occurs, namely, the most appropriate equalizer and PRML detector, on the basis of BER #1, BER #2 and BER #3 sequentially calculated through the above process, and controls the first and second switches according to the selected path. Therefore, a bit detection mode optimal to the recording capacity of the optical disc loaded in the device is performed and the data playback operation is thus normally performed.

Although the playback control method has been disclosed in association with a read-only optical disc, for example, a BD-ROM, for illustrative purposes, this invention is also applicable to a writable medium, such as a BD-RE or WO, to control a data recording operation.

As apparent from the above description, the present invention provides a high-density recording medium and a method and apparatus for controlling data playback thereof, wherein it is possible to perform a data playback operation optimal to the recording capacity of a BD-ROM (Blu-ray Disc-ROM) even through disc information (DI) is recorded in a PIC (Permanent Information & Control data) zone of the BD-ROM in a recording format necessitating a decoding process and the recording capacity is any of different values such as 23 Gbytes, 25 Gbytes, 27 Gbytes, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A recording medium, comprising:
    an information zone including a lead-in zone in which medium information is recorded, a data zone in which main data is recorded or to be recorded and a lead-out zone; and
    a burst cutting area, prior to the information zone, in which control information about a recording capacity of the recording medium is recorded,
    wherein the control information is one of the medium information recorded in the lead-in zone, the burst cutting area includes at least one data unit, each data unit includes data field of four rows and parity field of four rows, each row of the data field includes a sync byte and four information bytes sequentially and each row of the parity field includes a sync byte and four parity bytes sequentially.

2. A recording medium as set forth in claim 1, wherein the control information is channel bit length information variably set depending on the recording capacity of the recording medium.

3. A recording medium as set forth in claim 2, wherein the channel bit length information is one of values corresponding to recording capacities of 23 GBytes, 25 GBytes and 27 GBytes.

4. A recording medium as set forth in claim 1, wherein each data unit includes the control information.

5. A recording medium as set forth in claim 1, wherein the control information is recorded in a predetermined byte position of each data unit.

6. A recording medium as set forth in claim 1, wherein the control information is detected without a separation decoding process.

7. A method for controlling data playback/recording of a recording medium, comprising:
    detecting control information about a recording capacity of the recording medium from a burst cutting area located prior to a lead-in zone, the control information being one of medium information recorded in the lead-in zone; and
    controlling a data playback or recording operation in accordance with the control information,
    wherein the burst cutting area includes at least one data unit, each data unit includes data field of four rows and parity field of four rows, each row of the data field includes a sync byte and four information bytes sequentially and each row of the parity field includes a sync byte and four parity bytes sequentially,
    wherein the detecting step detects the control information from a predetermined byte position of at least one data unit.

8. A method as set forth in claim 7, wherein the control information is channel bit length information variably set depending on the recording capacity of the recording medium.

9. A method as set forth in claim 8, wherein the channel bit length information is one of values corresponding to recording capacities of 23 GBytes, 25 GBytes and 27 GBytes.

10. A method as set forth in claim 7, wherein each data unit includes the control information.

11. A method as set forth in claim 7, wherein the detecting step detects the control information without a separation decoding process.

12. An apparatus for controlling data playback/recording of a recording medium, comprising:
a pick-up unit configured to read or write data from or in the recording medium; and
a control unit configured to control the pick-up unit to read control information about a recording capacity of the recording medium from a burst cutting area located prior to a lead-in zone, the control information being one of medium information recorded in the lead-in zone,
wherein the burst cutting area includes at least one data unit, each data unit includes data field of four rows and parity field of four rows, each row of the data field includes a sync byte and four information bytes sequentially and each row of the parity field includes a sync byte and four parity bytes sequentially,
wherein the control unit is configured to control the pick-up to read the control information from a predetermined byte position of at least one data unit.

13. An apparatus as set forth in claim 12, wherein the control information is channel bit length information variably set depending on the recording capacity of the recording medium.

14. An apparatus as set forth in claim 13, wherein the channel bit length information is one of values corresponding to recording capacities of 23 GBytes, 25 GBytes and 27 GBytes.

15. An apparatus as set forth in claim 12, wherein each data unit includes the control information.

16. An apparatus as set forth in claim 12, wherein the control unit is configured to extract the control information without a separation decoding process.

* * * * *